Patented Oct. 17, 1939

2,176,505

UNITED STATES PATENT OFFICE 2,176,505

AZO COMPOUNDS

James G. McNally and Joseph B. Dickey, Rochester, N. Y., assignors to Eastman Kodak Company, Rochester, N. Y., a corporation of New Jersey No Drawing. Application March 13, 1937, Serial No. 130,800

1 Claim. (Cl. 260—163)

This invention relates to azo compounds. More particularly it relates to nuclear non-sulfonated aryl azo compounds suitable for the coloration of organic derivatives of cellulose. The invention includes the azo compounds, the process for their preparation, the process of coloring with them and materials colored with the azo compounds.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. It is an object of our invention to provide dye compounds which have an affinity for materials made of or containing organic derivatives of cellulose and which satisfactorily dye or color these materials.

The compounds of our invention have the general formula:

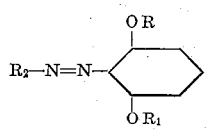

wherein R and $R_1$ each represent an alkyl or hydroxyalkyl group and $R_2$ represents an aromatic or heterocyclic nucleus. When $R_2$ represents an aromatic nucleus it is, advantageously, an aryl nucleus of the benzene series.

The compounds of our invention may be prepared by diazotizing an amine having the general formula:

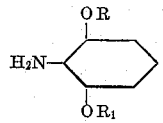

wherein R and $R_1$ each represent an alkyl or hydroxyalkyl group and coupling with an aromatic or heterocyclic nucleus.

The nuclear non-sulfonated azo compounds having the general formula above given constitute valuable dyes which may be employed for the dyeing or coloration of materials made of or containing organic derivatives of cellulose. By the employment of said nuclear non-sulfonated azo compounds dyeings of good fastness to light and washing, ranging in shade from yellow to red, may be produced. The nuclear sulfonated azo compounds possess little or no applicability for the coloration of organic derivatives of cellulose but may be employed to color cotton, wool and silk, for example, by customary methods of application.

The following examples illustrate the method of preparation of the azo compounds of our invention.

Example 1

15.3 grams of 1-amino-2,6-dimethoxy benzene are dissolved in a mixture of 200 grams of ice and water containing 25 ccs. of 36% hydrochloric acid and diazotized by the gradual addition, with stirring, of a water solution of 6.9 grams of sodium nitrite. A temperature of 0–5° C. is maintained throughout the diazotization operation.

14.0 grams of 5,5-dimethyl-1,3-cyclohexadione are dissolved in 200 ccs. of water containing 16.4 grams of sodium carbonate. The resulting solution is cooled by the addition of ice and the diazonium solution prepared as described above is gradually added with stirring. Coupling begins at once. Upon completion of the coupling reaction the mixture is made acid to litmus with acetic acid and the precipitated greenish-yellow dye is recovered by filtration, washed with water and dried.

Example 2

The diazonium solution prepared as described in Example 1 is added, with stirring, to 13.9 grams of α-naphthylamine dissolved in 200 ccs. of cold glacial acetic acid. The reaction mixture resulting is cooled in ice and sodium acetate added until Congo red paper is no longer colored blue. Following the addition of the sodium acetate the mixture is allowed to stand over night, for example, in ice after which the desired reddish-purple dye formed is precipitated by adding water, recovered by filtration, washed and dried.

Example 3

15.3 grams of 1-amino-2,6-dimethoxy benzene are dissolved in 200 grams of water containing 25 ccs. of 36% hydrochloric acid. The resulting solution is cooled to a temperature approximating 0–5° C. and diazotized in the usual manner by the addition of a water solution of 6.9 grams of sodium nitrite.

17.5 grams of ethyl-β-hydroxyethylaniline are dissolved in 105 grams of glacial acetic acid, the resulting solution is cooled, and the diazo solution prepared above is added thereto with stirring. Following the addition of the diazo solution, the mixture is permitted to stand after which it is made neutral to Congo red paper by the addition of sodium acetate. The mixture is then permitted to stand for some time after which the desired product is precipitated by the addition of water, recovered by filtration, washed and dried.

Example 4

18.1 grams of 1-amino-2,6-diethoxy benzene are dissolved in 200 grams of water containing 25 ccs. of 36% hydrochloric acid. The resulting solution is cooled to a temperature approximating 0–5° C. and diazotized in the usual manner by the addition of an aqueous solution of 6.9 grams of sodium nitrite.

17.4 grams of 1-phenyl-3-methyl-5-pyrazolone are dissolved in 200 grams of water containing 31.8 grams of sodium carbonate and coupled in accordance with the usual practice with the diazo solution prepared above. Upon completion of the coupling reaction, the mixture is made slightly acid to litmus with acetic acid and the precipitated dye compound is recovered by filtration, washed with water and dried.

*Example 5*

15.3 grams of 1-amino-2,6-dimethoxy benzene are dissolved in 200 grams of water containing 25 ccs. of 36% hydrochloric acid. The resulting solution is cooled to a temperature approximating 0–5° C. and diazotized by the addition of a water solution of 6.9 grams of sodium nitrite.

16.3 grams of diphenylamine are dissolved in 157 grams of glacial acetic acid. The resulting solution is cooled and coupled in the usual manner with the diazo solution prepared above. Upon completion of the coupling reaction, the dye compound formed is precipitated by the addition of water, recovered by filtration, washed and dried.

*Example 6*

15.3 grams of 1-amino-2,6-dimethoxy benzene are dissolved in 200 grams of water containing 25 ccs. of 36% hydrochloric acid. The resulting solution is cooled to a temperature approximating 0–5° C. and diazotized by the addition of a water solution of 6.9 grams of sodium nitrite.

10.8 grams of p-cresol are dissolved in 100 grams of water containing 12 grams of sodium hydroxide. The mixture is cooled by the addition of ice and the diazonium solution prepared above is added with stirring. After standing for about one hour, the mixture is made acid to litmus with acetic acid and the desired azo compound is recovered by filtration, washed with water and dried.

Phenol, resorcinol, salicylic acid and β-naphthol, for example, can be substituted for p-cresol and coupled in an exactly similar manner.

*Example 7*

57.3 grams of 1-amino-2,6-dicetyloxybenzene are diazotized in the usual manner and the diazonium solution formed is coupled with 22.4 grams of 1-naphthol-5-sulfonic acid dissolved in 100 cc. of ice water containing 25 grams of sodium carbonate. Upon completion of the coupling reaction, the mixture is made acid to Congo red paper with a mineral acid such as hydrochloric acid and the desired azo compound is precipitated by the addition of sodium chloride. The dye compound formed may be recovered by filtration, washed with water and dried.

The dye compound of this example colors textile materials such as wool, cotton, and silk orange red shades from an aqueous solution which may contain sodium chloride. This dye compound is oil soluble.

*Example 8*

40.3 grams of 1-amino-2-oleyloxy-6-β-hydroxyethoxybenzene are diazotized in the usual manner.

39.5 grams of 1-n-butylamino-8-naphthol-5-sulphonic acid are dissolved in cold dilute hydrochloric acid and the diazonium solution prepared above is added with stirring. The coupling reaction which takes place is completed by the addition of sodium acetate. Upon completion of the coupling reaction, the desired azo dye compound may be precipitated by the addition of sodium chloride, recovered by filtration, washed with water and dried.

The dye compound of this example colors wool, cotton and silk rubine shades from an aqueous solution of the dye which may contain sodium chloride.

In order that our invention may be fully understood the preparation of a number of amines which may be employed in the production of the compounds of the invention is disclosed hereinafter.

Amines represented by the general formula:

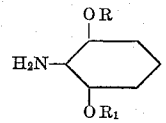

wherein R and R₁ represent alkyl groups may be prepared by alkylating by known methods 1-nitro-2,6-dihydroxybenzene to form a 1-nitro-2,6-dialkoxybenzene which may be converted to a 1-amino-2,6-dialkoxybenzene by reducing the nitro group to an amino group. The preparation of compounds wherein R and R₁ represent hydroxyalkyl groups is disclosed hereinafter.

*Preparation of 1-amino-2,6-dimethoxybenzene*

The preparation of this compound illustrates the general method of preparation outlined above.

Starting with 1-nitro-2,6-dihydroxybenzene, which may be employed as the initial material from which the amines of the present invention can be prepared, 1-nitro-2,6-dimethoxybenzene can be formed by alkylation and by reducing this compound 1-amino-2,6-dimethoxybenzene can be obtained.

1-nitro-2,6-dihydroxybenzene can be prepared as described in the Journal of the American Chemical Society, vol. 55, page 4226 (1933) or Berichte der Deutschen Chemischen Gesellschaft, vol. 37, page 726 (1905). This compound can be converted by alkylation to 1-nitro-2,6-dimethoxybenzene and this latter compound in turn reduced to 1-amino-2,6-dimethoxybenzene. The alkylation and reduction can be carried out as described in the Journal of the American Chemical Society, vol. 55, pages 4226 and 4227 (1933).

*Preparation of 1-amino-2-methoxy-6-ethoxybenzene*

155 grams of 1-nitro-2,6-dihydroxybenzene are dissolved in a dilute aqueous sodium hydroxide solution, the resulting solution is heated to boiling and a mixture of 156 grams of methyl iodide and 173 grams of ethyl iodide is slowly added. 1-nitro-2-methoxy-6-ethoxybenzene separates and may be recovered by filtration and purified if desired. 1-amino-2-methoxy-6-ethoxybenzene may be obtained by reduction of the 1-nitro-2-methoxy-6-ethoxybenzene in known fashion.

Preparation of

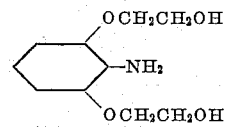

155 grams of 1-nitro-2,6-dihydroxybenzene are refluxed in toluene with 150 grams of sodium carbonate and 200 grams of ethylene chlorohydrin for about 20 hours. When the reaction is complete the mixture is extracted with water and then with a dilute aqueous solution of sodium hydroxide. The extract is removed and

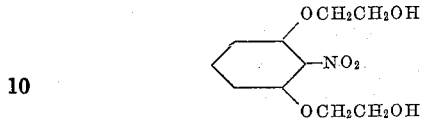

recovered from the remaining toluene fraction by evaporating the toluene.

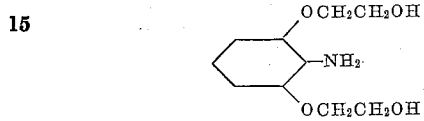

can be obtained by reduction of the corresponding nitro compound prepared as just described.

It will be understood that the exact manner of preparing the amines used in the preparation of the compounds of our invention forms no part of the present invention. These compounds may be prepared in any other suitable manner desired.

The following tabulation illustrates compounds included within the scope of our invention together with the color they produce on cellulose acetate silk. The compounds indicated below may be prepared by diazotizing the amines listed under the heading "Amine" and coupling with the compounds specified in the column entitled "Coupling component". The diazotization and coupling reactions may, for example, be carried out following the general procedure described in Examples 1 to 8, inclusive.

persing agents and the amounts of dispersing agent and dye which may be employed, for example, are of general applicability. The general methods by which the dye compounds may be applied to the coloration of other materials are well known in the art and need not be described here.

In employing the azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C. for example, following which the temperature of the dye bath will be raised to that selected for carrying out the dyeing operation. Sodium chloride may be added as desired during the dyeing operation to promote exhaustion of the dyebath. The temperature at which the dyeing is conducted will vary somewhat, depending, for example, on the particular material or materials undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder dyeing can be satisfac-

| Amine | Coupling component | Color on cellulose acetate silk |
|---|---|---|
| 1-amino-2,6-dimethoxybenzene | Thiobarbituric acid | Yellow. |
| Do | α-naphthylamine | Brown. |
| Do | 1-phenyl-3-methyl-5-pyrazolone | Yellow. |
| Do | Barbituric acid | Green-yellow. |
| Do | 5,5-dimethyl-1,3-cyclohexadione | Do. |
| Do | Salicylic acid | Yellow. |
| Do | Phenol | Do. |
| Do | Resorcinol | Do. |
| Do | p-Cresol | Do. |
| Do | β-naphthol | Claret. |
| Do | m-Phenylene diamine | Red. |
| Do | β-hydroxy-naphthoic acid | Bluish red. |
| 1-amino-2,6-diethoxybenzene | β-naphthol | Red. |
| Do | 5,5-dimethyl-1,3-cyclohexadione | Canary yellow. |
| Do | Barbituric acid | Green-yellow. |
| 2,6-di(β-hydroxyethoxy)aniline | Salicylic acid | Orange-yellow. |
| 2,4,6-tri(β-hydroxyethoxy)aniline | 1-phenyl-3-methyl 5-pyrazolone | Green-yellow. |
| 1-amino-2,6-dimethoxybenzene | Dimethylaniline | Yellow. |
| Do | Di-β-hydroxyethylaniline | Do. |
| Do | m-Anisidine | Do. |
| Do | 1-methyl-3-β-hydroxyethylaminobenzene | Do. |

In order that the application of the compounds of our invention may be clearly understood their application to the dyeing of materials made of or containing an organic derivative of cellulose, and more particularly cellulose acetate silk, is described hereinafter. Although the remarks are more particularly directed to the dyeing of the above mentioned materials those pertaining to the general method ordinarily employed, the distorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Because of these considerations when a dispersing agent is to be employed preferably it is a neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acids, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye-bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with a coupling component such as barbituric acid, 1-phenyl-3-methyl-5-pyrazolone or di-β-hydroxyethylaniline, for example. Conversely the material undergoing dyeing or coloration may first be treated to absorb one of said coupling components and the dye subsequently formed in situ by coupling with an aryl diazonium salt of the invention.

The following examples illustrate how dyeing may be carried out in accordance with our invention. Quantities are expressed in parts by weight.

*Example A*

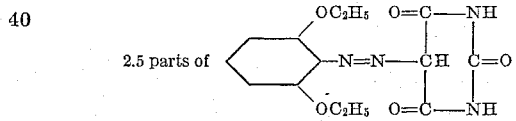

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk, in the form of yarn or fabric, for example, are added to the dyebath after which the temperature is gradually raised to 80–85° C. and the silk worked for several hours at this latter temperature. Sodium chloride may be added as desired during the dyeing operation to promote exhaustion of the dyebath. Upon completion of the dyeing operation the cellulose acetate silk is removed, washed with soap, rinsed and dried. The cellulose acetate silk is colored a greenish-yellow shade of excellent fastness to light.

*Example B*

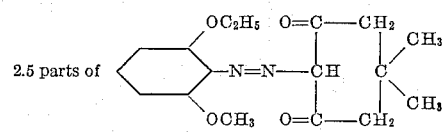

are substituted for the dye compound of Example A and dyeing is carried out exactly as described in said example. The cellulose acetate is similarly dyed in a greenish-yellow shade of excellent fastness to light.

*Example C*

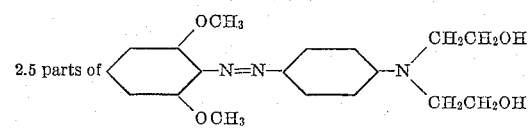

are substituted for the dye compound of Example A and dyeing is carried out exactly as described in said example. The cellulose acetate is similarly dyed a greenish-yellow shade of excellent fastness to light.

While our invention has been illustrated in connection with the dyeing of cellulose acetate silk it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

The azo compound having the formula:

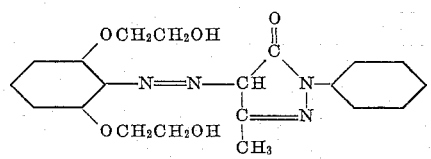

JAMES G. McNALLY.
JOSEPH P. DICKEY.